Patented Aug. 26, 1952

2,608,546

UNITED STATES PATENT OFFICE 2,608,546

MODIFIED MELAMINE-FORMALDEHYDE RESINS

Elwood F. Jackson, Ludlow, Mass., assignor to Monsanto Chemical Company, St. Louis, Mo., a corporation of Delaware No Drawing. Application January 26, 1949, Serial No. 72,997

7 Claims. (Cl. 260—45.1)

This invention relates to new resinous compositions. More particularly, the invention relates to modified melamine resins.

An object of this invention is to modify melamine-formaldehyde resins.

A further object of this invention is to provide a melamine-formaldehyde resin which is water soluble in the intermediate fusible stage.

Still another object of this invention is to provide paper having high wet strength containing a modified melamine-formaldehyde resin.

These and other objects are attained by condensing melamine with formaldehyde and salicylic acid or the alkali metal salts thereof.

The following examples are given in illustration and are not intended as limitations upon the scope of this invention. Where parts are mentioned they are parts by weight.

Example I

A mixture was prepared containing 126 parts (1 mol) of melamine, 728 parts (8 mols) of formalin (37% formaldehyde), 126 parts (0.9 mol) of salicylic acid and 240 parts of water. The mixture was heated on a water bath with stirring until a clear solution formed. The pH of the solution was then adjusted to about 7–8 with aqueous alkali and the solution was then heated under reflux at atmospheric pressure for five hours with constant agitation. After cooling, the product was a water solution of a clear colorless high molecular weight resin. The resin could be freed from water by spray drying, oven drying and other conventional means to obtain a fine powder completely soluble in water. The powder could be molded without further additions and cured at temperatures of from 100 to 200° C.

Example II

A mixture of 1 mol of melamine, 8 mols of formalin and 1 mol of sodium salicylate was heated on a water bath until a clear solution formed. The solution was then adjusted to a pH of about 7–8 with aqueous alkali and heated under reflux at atmospheric pressure for about 5 hours to obtain a water solution of a clear colorless resin of high molecular weight. The resin could be freed from water by conventional drying means without changing its water solubility.

Example III

A solution of the resin made according to Example II containing about 5% solids by weight was added to an aqueous slurry of cellulosic fibers. The slurry was agitated for about 15 minutes and then sheets of paper were prepared from the fibers in the usual manner. The paper thus formed was dried for about 1 hour in an oven at approximately 100° C. after which it was treated at 150° C. for about 15 minutes to cure the resin on the fibers. The resultant paper was thoroughly soaked in water and tested for wet strength in comparison with paper similarly made from untreated fibers. The treated paper was vastly superior to the untreated paper in wet strength. It was found that the paper had picked up about 3% of resin by weight based on the weight of the paper. Only traces of resin were found in the waste water from the paper forming operation.

The resins of the invention are reaction products of salicylic acid or an alkali metal salt thereof with melamine and formaldehyde. The salicylic acid or its alkali metal salt are firmly held in the molecules of the final resin by chemical bonds and they cannot be removed from the resin except by destroying it. The alkali metal salts which may be used include lithium, sodium, potassium, rubidium and cesium salicylates. The amount of formaldehyde used to prepare the resins of this invention may be varied from about 1 to 6 or more mols of formaldehyde per mol of melamine. As shown in the examples it is often advantageous to use an excess of formaldehyde especially when it is desired to react six mols with the melamine. The excess formaldehyde is driven off during the drying operations at the end of the reaction. The salicylic acid or salt thereof may be used in quantities ranging from 0.5 to 2 mols per mol of melamine, depending upon the extent of water solubility and molecular weight desired in the intermediate fusible product. For use in increasing the wet strength paper the optimum range is from 0.8 to 1 mol per mol of melamine.

The resins are prepared most easily by mixing all of the ingredients with water, heating gently, i. e., from 40 to 80° C. until a clear solution forms and finishing the reaction under reflux conditions and atmospheric pressure at a pH of from 7 to 8. The reaction may also be carried out in alcoholic solution, if desired. The last phase of the reaction may be carried out at temperatures as low as 60° C. if desired but the duration of the reaction is substantially increased at the lower temperatures. However, the products of the reaction at the lower temperatures are of somewhat lower molecular weight which is desirable for some applications.

At the end of the reaction a water solution of the resin is obtained which may be used without further modification or treatment for impregnating paper webs, cellulosic fibers or textiles. If desired, the resin may be recovered from the water solution by spray drying, oven drying or other conventional drying processes. The recovered resin is still fusible and water-soluble and may be redissolved in water for impregnation purposes. The dry powder may also be molded without modification or after modification with fillers, pigments, dyes, lubricants and other standard additives.

Whether impregnated on paper and textiles, or used as a molding material, the resins of this invention may be cured to the insoluble, infusible state by heating them for a relatively short time at from 100–200° C. If desired to speed up the curing, acid curing catalysts may be incorporated in the resin. However, these catalysts are generally detrimental to paper and textiles and will not ordinarily be used in such applications of the resin.

Aside from their value as paper and textile impregnants and as molding powders, the resins of this invention are valuable for use in the preparation of paints and adhesives in which water is used as the solvent or thinning vehicle instead of organic solvents. Both paints and adhesives made therewith form continuous films which have strong adhesions to various surfaces such as wood, paper, metal, etc. The paints and adhesives may be rendered curable at room temperatures by incorporating therein acid curing catalysts such as p-ethyl toluene sulfonic acid.

It is obvious that many variations may be made in the products and processes of this invention without departing from the spirit and scope thereof as defined in the appended claims.

What is claimed is:

1. A resinous product comprising a condensation product of 1 mol of melamine with from 1 to 6 mols of formaldehyde and from 0.5 to 2 mols of salicylic acid, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

2. A resinous product comprising a condensation product of 1 mol of melamine with 6 mols of formaldehyde and 1 mol of salicylic acid, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

3. Paper having high wet strength comprising paper, the fibers of which are impregnated with a cured condensation product of 1 mol of melamine with 1 to 6 mols of formaldehyde and from 0.5 to 2 mols of salicylic acid, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

4. A resinous product comprising the condensation product of 1 mol of melamine with from 1 to 6 mols of formaldehyde and from 0.5 to 2 mols of a compound taken from the group consisting of salicylic acid and the alkali metal salt thereof, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

5. A resinous product comprising the condensation product of 1 mol of melamine with 6 mols of formaldehyde and 1 mol of sodium salicylate, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

6. Paper having high wet strength comprising paper, the fibers of which are impregnated with a cured condensation product of 1 mol of melamine with 6 mols of formaldehyde and 1 mol of sodium salicylate, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

7. A water-soluble fusible condensation product of 1 mol of melamine with from 1 to 6 mols of formaldehyde and from 0.5 to 2.0 mols of a compound taken from the group consisting of salicylic acid and the alkali metal salts thereof, said condensation product having been prepared by heating a mixture of the reactive ingredients at from 40° C. to 80° C. until a clear solution is formed and then heating the solution at from 60° C. to reflux temperature and atmospheric pressure at a pH of from 7 to 8.

ELWOOD F. JACKSON.

REFERENCES CITED

The following references are of record in the file of this patent:

UNITED STATES PATENTS

| Number | Name | Date |
| --- | --- | --- |
| 2,368,451 | D'Alelio | Jan. 30, 1945 |
| 2,413,697 | Edgar | Jan. 7, 1947 |
| 2,463,032 | Hanson | Mar. 1, 1949 |
| 2,524,112 | La Piana et al. | Oct. 3, 1950 |

FOREIGN PATENTS

| Number | Country | Date |
| --- | --- | --- |
| 137,743 | Switzerland | Apr. 1, 1930 |
| 502,720 | Great Britain | Mar. 23, 1939 |
| 527,414 | Great Britain | Oct. 8, 1940 |